UNITED STATES PATENT OFFICE 1,941,951

SEPARATING ACETIC ACID FROM ACETIC ACID ANHYDRIDE

Richard Müller, Hans Hatzig, and Erich Rabald, Mannheim, Germany, assignors to C. F. Boehringer & Soehne G. m. b. H., Mannheim-Waldorf, Germany No Drawing. Application January 16, 1931, Serial No. 509,267, and in Germany January 18, 1930

10 Claims. (Cl. 260—123)

Our invention relates to the separation of acetic acid from acetic acid anhydride and more especially to means whereby these two compounds can be separated from each other and from the water, which may be present, for instance, if dilute acetic acid is concerned.

It is an object of our invention to provide means for effecting the separation, which are more efficient than other means hitherto used for the same purpose.

In view of the closely adjacent boiling temperatures of acetic acid and acetic acid anhydride separation of the two compounds by distillation requires the use of special apparatus and is connected with a great consumption of heat energy. In view of the corrosive action of the mixture the apparatus used in the distillation is soon worn out.

To separate the anhydride from the acid by fractional distillation is impossible, if, as is frequently the case when acting upon waste liquors containing acetic acid anhydride, a solvent is present, which forms with the acetic acid or the anhydride or with both of them a mixture having a constant boiling point.

If besides acetic acid and acetic acid anhydride also water is present, as is for instance the case in the products of reaction resulting in the production of acetic acid anhydride by thermic decomposition of acetic acid, the further difficulty must be dealt with, that at the higher temperatures required in the distillation process a considerable part of the anhydride will react with the water and be converted into acetic acid.

We have now found that acetic acid and acetic acid anhydride, which are mixed with each other, can be separated from each other much more readily and efficiently by cooling the mixture.

As no data were available regarding the behaviour of such mixtures at low temperatures, nobody could foresee that the separation of its constituents would be possible on a commercial scale and would not be hampered by the formation of eutectics. By operating at low temperatures corrosion of the apparatus used is greatly reduced.

The cooling down of the mixture to a low temperature can be effected in any suitable manner, for instance by cooling from without the vessel or the like containing the mixture, we may however also add to the mixture a cooling agent, such as solid carbon dioxide.

If the mixture contains also water, we are enabled by vigorous cooling, for instance, to not more than 20–40° C. below zero, to reduce the mutual solubility factor of the three components of the mixture to the extent that the anhydride can readily be recovered in a state of concentration, which allows its being used directly for the purposes of acetylation.

If the mixture is rapidly cooled down to very low temperatures, all of the water crystallizes out together with the main portion of the acetic acid, while the anhydride remains over as a liquid together with the rest of acetic acid and can easily be separated from the solids. However, if we cool the mixture down in steps, we first obtain a solid fraction, which according to the conditions, under which cooling has been effected, consists of pure or highly concentrated acetic acid, thereafter a further solid fraction consisting of acetic acid and the water contained in the mixture and a liquid fraction consisting of the anhydride and the rest of the acetic acid. Obviously the proportions and constitution of the fractions will be influenced apart from the conditions of operation also by the composition of the starting mixture.

We are enabled to further increase the effect to be obtained in separating acetic acid anhydride from dilute acetic acid by adding substances, which are capable, either singly or all together, to diminish the solubility factor of water in the liquid phase. Of such substances we may mention by way of example hydrocarbons such as benzene, toluene, methylene chloride, carbon disulfide, liquid sulfur dioxide, a mixture of liquid sulfur dioxide and carbon dioxide etc. If such substances, which at the low temperature at the same time act as solvents for the acetic acid, are added in greater quantity, we obtain a cleaner and simpler separation, because in this case the water will crystallize out by itself.

By adding substances, such as liquid sulfur dioxide, which at the same time act as cooling agents, we obtain the further advantage of effecting, by adding them to the mixture, the most efficient kind of cooling, so that indirect cooling may even be dispensed with altogether.

Example 1

A mixture composed of 20 parts by weight acetic acid and 50 parts acetic acid anhydride is cooled down to 70° C. below zero. The acetic acid crystallizes out and the filtrate obtained by rapid suction, the access of heat from the outside being prevented, consists practically of pure acetic acid anhydride.

Example 2

A mixture composed of 25 parts acetic acid, 15 parts acetic acid anhydride and 65 parts toluene is cooled down to 68–70° C. below zero. The solid fraction which separates out, consists of acetic acid and is seperated from the liquid by centrifuging. The liquid contains almost all of the toluene and of the acetic acid anhydride, traces of which still adhere to the acetic acid crystals. While toluene and acetic acid form a mixture having a constant boiling point, so that they cannot be separated by distillation, the separation of toluene from acetic acid anhydride can be effected by distillation. In some cases, such as in many cases of acetylation, where the presence of toluene or of some other organic solvents is not injurious or even desirable, that fraction of the cooled mixture, which remains liquid, can be reused without previous distillation or other separation.

Example 3

A mixture composed of 102 parts acetic acid anhydride, 120 parts acetic acid and 18 parts water is cooled down to 30° C. below zero. There results a solid fraction containing 55 parts acetic acid and 2 parts water, which is separated from the liquid by filtration. By cooling the filtrate down to 40° C. below zero 60 parts acetic acid and 16 parts water are separated out as solids, so that there remains over a liquid fraction free from water and composed of acetic acid anhydride and 5 parts of acetic acid.

Example 4

If the mixture described with reference to Example 3 is cooled down directly to 40° C. below zero, all the water will separate out together with 115 parts acetic acid, while the liquid phase consists of the anhydride and 5 parts acetic acid.

Example 5

To a mixture such as described with reference to Example 3 are added 360 parts cooled methylene chloride, whereby the mixture is cooled down to a temperature of about 50° C. below zero. The solid residue washed with cooled methylene chloride and separated by suction contains all the water and part of the acetic acid, while the filtrate consists of the anhydride, part of the acetic acid and the methylene chloride.

Example 6

To a mixture, such as described with reference to Example 3, are added 720 parts of liquid sulfur dioxide, the temperature being lowered down to 70° C. below zero. This drop of temperature causes the water to be separated out by crystallization, while the acetic acid and the anhydride are kept dissolved by the liquid sulfur dioxide. If the sulfur dioxide is separated by evaporation from the liquid mixture freed from water, the main part of the acetic acid will gradually separate out in solid form and a highly concentrated anhydride will remain over in the liquid phase.

Example 7

To a mixture composed of 50 parts acetic acid anhydride, 87 parts acetic acid and 13 parts water are added 780 parts of Pictet's mixture consisting of 450 parts liquid sulfur dioxide and 330 parts solid carbon dioxide. The temperature of the mixture is lowered down to 74° C. below zero, whereby all the water and some of the acetic acid are separated out as crystals, while a liquid mixture of acetic acid anhydride and acetic acid remains over in the mixture of sulfur dioxide and carbon dioxide. By slow evaporation of the two solvents most of the residual acetic acid can be separated out in crystalline form. If a larger quantity of Pictet's mixture is used, the water crystallizing out will be free from acetic acid.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim to any modification not covered by these claims is expressly reserved.

We claim:

1. In the separation of the constituents of a mixture containing acetic acid and acetic acid anhydride the step of cooling said mixture to a temperature ranging between 20° C. below zero and 74° C. below zero.

2. In the separation of the constituents of a mixture containing acetic acid, water and acetic acid anhydride the step of cooling said mixture to a temperature ranging between 20° C. below zero and 74° C. below zero.

3. In the separation of the constituents of a mixture containing acetic acid and acetic acid anhydride the step of fractionately cooling said mixture to a temperature ranging between 20° C. below zero and 74° C. below zero.

4. In the separation of the constituents of a mixture containing acetic acid, water and acetic acid anhydride the step of adding to the mixture an inert substance miscible with acetic acid, but immiscible with water, and cooling said mixture to a temperature ranging between 20° C. below zero and 74° C. below zero.

5. In the separation of the constituents of a mixture containing acetic acid and acetic acid anhydride the step of adding to said mixture an inert cooling agent and cooling said mixture to a temperature ranging between 20° C. below zero and 74° C. below zero.

6. In the separation of the constituents of a mixture containing acetic acid, water and acetic acid anhydride the step of adding to said mixture an inert cooling agent miscible with acetic acid, but immiscible with water, and cooling said mixture to a temperature ranging between 20° C. below zero and 74° C. below zero.

7. In the separation of the constituents of a mixture containing acetic acid, water and acetic acid anhydride the step of adding to said mixture toluene and cooling said mixture to a temperature ranging between 20° C. below zero and 74° C. below zero.

8. In the separation of the constituents of a mixture containing acetic acid, water and acetic acid anhydride the step of adding to said mixture methylene chloride and cooling said mixture to a temperature ranging between 20° C. below zero and 74° C. below zero.

9. In the separation of the constituents of a mixture containing acetic acid, water and acetic acid anhydride the step of adding to said mixture liquid sulfur dioxide to cool said mixture to a temperature ranging between 20° C. below zero and 74° C. below zero.

10. In the separation of the constituents of a mixture containing acetic acid, water and acetic acid anhydride the step of adding to said mixture liquid sulfur dioxide and solid carbon dioxide to cool said mixture to a temperature ranging between 20° C. below zero and 74° C. below zero.

RICHARD MÜLLER.
HANS HATZIG.
ERICH RABALD.